S. A. BRAZEAU.
GANG BREAD CUTTER.
APPLICATION FILED APR. 20, 1917.

1,237,162.

Patented Aug. 14, 1917.
2 SHEETS—SHEET 2.

WITNESSES

INVENTOR
S. A. Brazeau,
BY Victor J. Evans
ATTORNEY

UNITED STATES PATENT OFFICE.

SAMUEL A. BRAZEAU, OF SHANIKO, OREGON.

GANG BREAD-CUTTER.

1,237,162. Specification of Letters Patent. Patented Aug. 14, 1917.

Application filed April 20, 1917. Serial No. 163,524.

*To all whom it may concern:*

Be it known that I, SAMUEL A. BRAZEAU, a citizen of the United States, residing at Shaniko, in the county of Wasco and State of Oregon, have invented new and useful Improvements in Gang Bread-Cutters, of which the following is a specification.

This invention relates to cutters for slicing bread, cake, and other food substances which are usually in loaf form; and the object of the same is to produce a device of this character having a gang of cutters or blades so that a plurality of slices may be formed simultaneously.

The invention consists specifically in the framework in which the blades are mounted, and in other details as set forth in the following specification and shown in the drawings wherein:—

Fig. 3 is a plan view of the skeleton framework,

Figure 1:
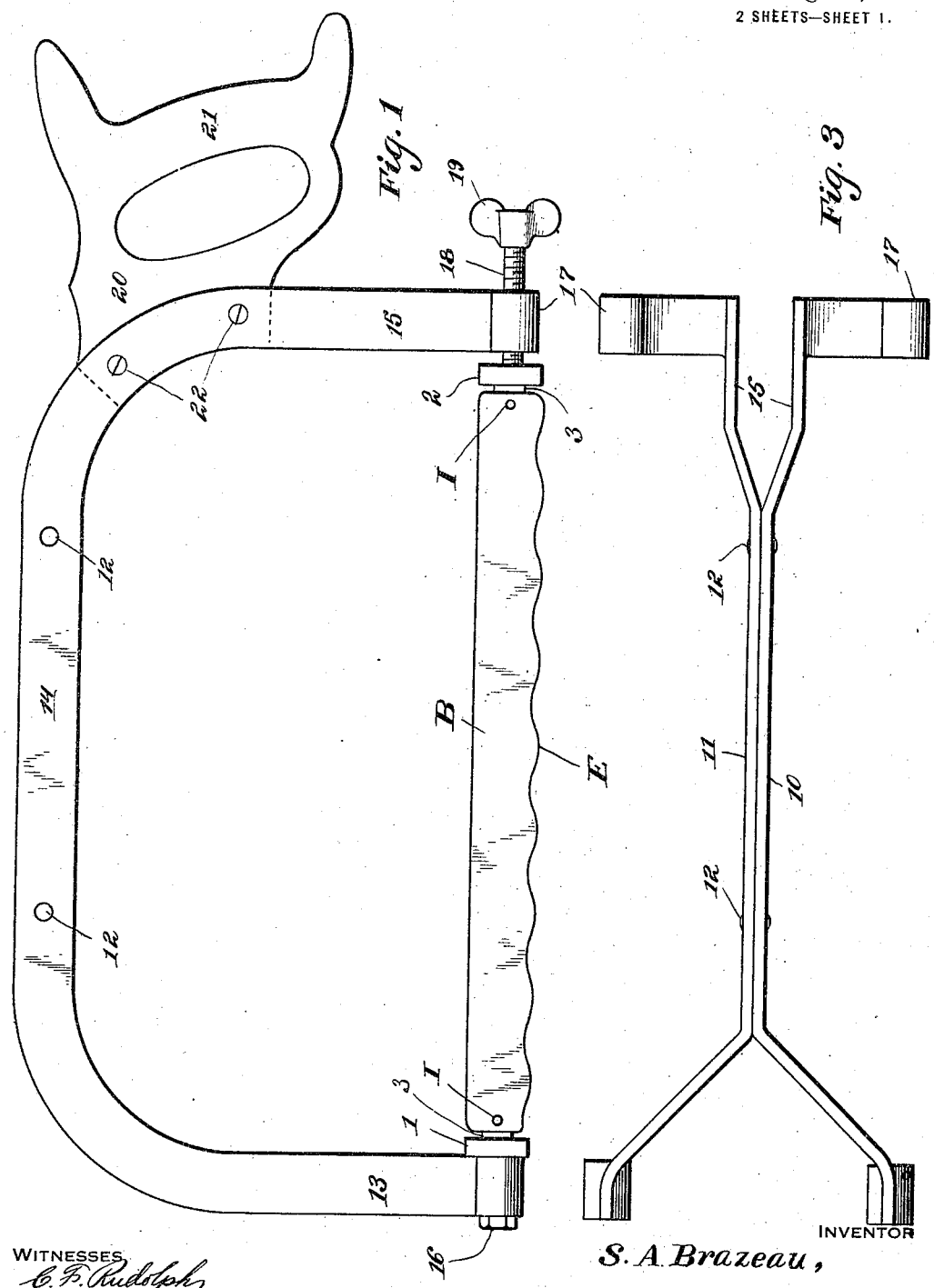
Figure 1 is a side elevation of this device complete.
Figure 2:
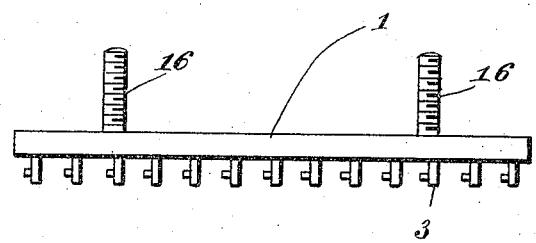
Fig. 2 is a plan view of the inner bar.
Figure 4:
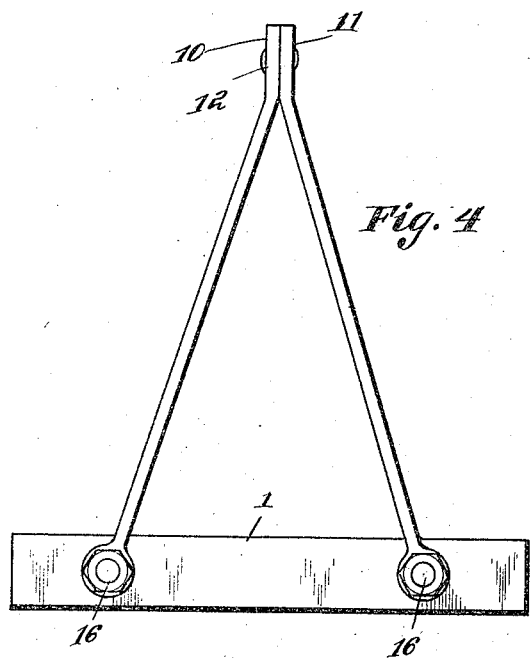
Fig. 4 is an outer end elevation of said framework with the outer bar attached.

In the drawings I have used the letter B to designate the cutters or blades, usually having a wavy edge E as when slices of bread or cake are to be cut from the loaf, and each blade in the present instance has an aperture or eye near each extremity, indicated by the letter I. I propose to use about a dozen of these blades in the instrument forming the subject matter of my invention, and I lay no claim to the specific details of construction of the blades themselves nor to the number which may be employed. If the structure is capable of carrying a dozen blades, some of them could be omitted, or any or all of them could be replaced by blades having other shapes of cutting edges and in fact adapted to be used for other purposes than slicing bread or cake or the like. This use of the invention does not require any great amount of strength, but it might be if the gang of blades were employed for cutting something tougher than bread, considerable strength in the frame work would be necessary in order to prevent it from twisting or bending out of shape when it was used. The primary purpose of the present invention is to detachably mount the gang of blades within a framework which is especially constructed to resist the strain thrown onto it in use, no matter what such use shall be, and to this end the details of the framework will now be described.

In the drawings the numerals 1 and 2 designate the outer and inner bars, each provided with a series of hooked studs 3 along its inner face, spaced as it is desired to space the blades in the gang referred to above, and with the exception of the details given below these bars are complementary of and reversely positioned with respect to each other, each extending along one end of the gang of blades B. I do not wish to be limited as to the studs, but as shown herein each consists of a square body or lug cast upon or fastened to its respective bar, and a lateral pin or projection at the inner end of the lug which is adapted to pass through the aperture or eye I in the end of the blade as seen. When the latter has become dull, by loosening the tension on the inner bar the blade may be detached from the studs and replaced by a new one, while the dull one is sharpened in any well known manner. The distance from one eye of each blade to its other should be precisely the same throughout all the blades in the gang, and therefore the bars 1 and 2 stand exactly parallel with each other when they coact successfully.

Figure 5:
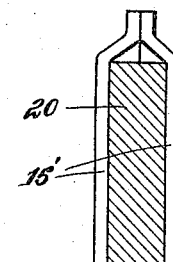
Fig. 5 is an inner end elevation of said frame work with the inner bar attached and the handle in section.
Figure 6:
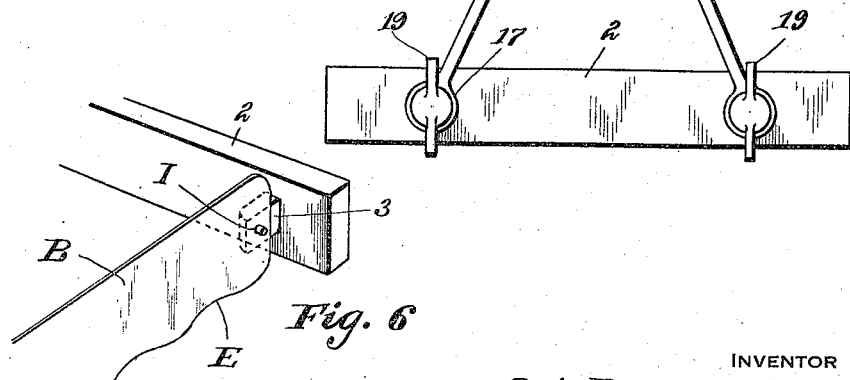
Fig. 6 is a perspective detail of one of the blades and a portion of the inner bar, showing the attachment of the end of the former to the stud on the latter.

The framework for carrying these bars is composed of two steel strips 10 and 11 which are also complementary of each other and whose centers are united side to side by transverse rivets or bolts 12 as best seen in Fig. 3. As appears in Fig. 1, each strip is arched, the same having an upright outer end 13, a substantially horizontal body 14, and an upright inner end 15. As best seen in Fig. 3 the outer ends 13 diverge from each other downward from the outermost bolt 12, and their lower extremities are provided with eyes connecting the ends of the outer bar 1 by means of bolts 16 or other fastening devices. As also best seen in Fig. 3, the inner ends 15 of the strips diverge from each other beyond the inner bolt 12, but their divergence is not on straight lines. Referring now to Fig. 5, it will be seen that the inner arms 15 diverge for a distance, are then parallel for a distance indicated at 15', and then again diverge; and their lower ends are provided with eyes 17. Through the latter project screws 18 which are rigidly secured at their inner ends to the inner bar 2, and thumb nuts 19 engage the outer ends of these screws. When the nuts are set up, tension is put on the screws and on the inner bar 2, and the latter through its connection with the inner ends of the several blades B, puts them under tension because their outer ends are held in the outer bar 1; the tension depending upon the tightness with which the thumb nuts are screwed up and the resiliency existent within the frame.

The handle 20 has a handhold 21 much like that of the ordinary hand saw, and in fact I preferably make this element of wood so that it further resembles the handle of the domestic saw. Its inner end is passed between the parallel portions 15' of the inner arms, and held there by screws or other fastening devices 22, and when in position it adds strength to these arms and rigidity to the entire framework. The strips of which the latter is composed should be of proper size to resist the strain thrown upon the gang of saws when they are at work, and by preference said strips will be nickeled or otherwise treated to prevent rust. The further details do not need elaboration.

In the use of this saw, the blades are inserted in a manner quite obvious and the instrument grasped by the hand which engages the handhold 21, and brought over the bread board or other support for the loaf or other article to be sliced. Then by reciprocating the cutting edges of the gang of blades across the loaf, the same is divided into a plurality of slices dependent upon the number of blades employed and whose thickness will be dependent upon the spacing of each blade. In order that the spacing may vary, it is quite possible to provide a plurality of outer and inner bars 1 and 2 with their studs differently spaced, and a pair of bars is selected which will hold the gang of blades the desired distance apart.

What is claimed as new is:—

In a gang cutter of the type described, the combination with a group of parallel blades having eyes through them near both ends, outer and inner bars having studs on their inner faces removably engaging said eyes, bolts projecting from the outer bar, and screws projecting from the inner bar; of a frame-work composed of complementary metal strips arched at their mid-length and there secured face to face to each other, the outer portions of the strips diverging and having eyes with which said bolts are connected, and the inner portions of said strips diverging from each other for a distance, then extending in parallelism, and then again diverging and having eyes through which said screws extend, thumb nuts on the protruding ends of the screws, and a handle having a hand-hold at its rear end and its forward end secured between said parallel portions, the whole for use substantially as described.

In testimony whereof I affix my signature.

SAMUEL A. BRAZEAU.

Copies of this patent may be obtained for five cents each, by addressing the "Commissioner of Patents, Washington, D. C."